US010211612B2

(12) United States Patent
Yamaguchi et al.

(10) Patent No.: US 10,211,612 B2
(45) Date of Patent: Feb. 19, 2019

(54) PROTECTIVE TEXTILE SLEEVE WITH HOT MELT FIXATION, END FRAY PREVENTION LAYER AND METHODS OF CONSTRUCTION AND APPLICATION THEREOF

(71) Applicant: Federal-Mogul Powertrain, Inc., Southfield, MI (US)

(72) Inventors: Hiroki Yamaguchi, Kanagawa (JP); Shozo Fukuyama, Tokyo (JP)

(73) Assignee: Federal-Mogul Powertrain LLC, Southfield, MI (US)

( * ) Notice: Subject to any disclaimer, the term of this patent is extended or adjusted under 35 U.S.C. 154(b) by 736 days.

(21) Appl. No.: 14/468,997

(22) Filed: Aug. 26, 2014

(65) Prior Publication Data
US 2015/0056388 A1 Feb. 26, 2015

Related U.S. Application Data

(60) Provisional application No. 61/869,842, filed on Aug. 26, 2013.

(51) Int. Cl.
B32B 37/24 (2006.01)
B32B 37/12 (2006.01)
(Continued)

(52) U.S. Cl.
CPC ........... H02G 3/0481 (2013.01); B29C 63/18 (2013.01); B32B 1/08 (2013.01); B32B 5/026 (2013.01);
(Continued)

(58) Field of Classification Search
CPC .. F16L 57/06; F16L 58/1063; C09J 2203/302; C09J 2400/263; C09J 7/043;
(Continued)

(56) References Cited

U.S. PATENT DOCUMENTS 3,466,210 A    9/1969 Wareham
4,359,556 A *  11/1982 Lakshmanan .......... C09J 177/08
                                                    525/420.5
(Continued)

FOREIGN PATENT DOCUMENTS

DE         10140774 B4    8/2004
DE    202010014239 U1    12/2010
(Continued)

OTHER PUBLICATIONS

International Search Report, dated Nov. 25, 2014 (PCT/US2014/052721).

Primary Examiner — Yan Lan
(74) Attorney, Agent, or Firm — Robert L. Stearns; Dickinson Wright, PLLC

(57) ABSTRACT

A protective textile sleeve having enhanced end fray resistance and being adapted to be bonded to an elongate member extending therethrough, and method of construction thereof, are provided. The sleeve has a wall with a cavity bounded by an innermost surface extending between opposite open ends. A first material, including a hot melt adhesive material, facilitating bonding the wall to an outer surface of an elongate member extending therethrough, is bonded to the wall immediately adjacent the opposite ends, and a second material, facilitating prevention of end fray of the wall ends, including an elastomeric material is bonded to the wall immediately adjacent the opposite ends.

3 Claims, 3 Drawing Sheets

(51) Int. Cl.
*H02G 3/04* (2006.01)
*H01B 3/50* (2006.01)
*D04C 1/12* (2006.01)
*F16L 57/06* (2006.01)
*D06N 3/00* (2006.01)
*B32B 5/02* (2006.01)
*B32B 7/12* (2006.01)
*B32B 1/08* (2006.01)
*B29C 63/18* (2006.01)
*B29C 65/18* (2006.01)
*B29C 65/48* (2006.01)
*B29C 65/00* (2006.01)

(52) U.S. Cl.
CPC .............. *B32B 7/12* (2013.01); *D06N 3/00* (2013.01); *F16L 57/06* (2013.01); *H01B 3/50* (2013.01); *B29C 65/18* (2013.01); *B29C 65/4815* (2013.01); *B29C 66/1122* (2013.01); *B29C 66/4322* (2013.01); *B29C 66/496* (2013.01); *B29C 66/53241* (2013.01); *B29C 66/71* (2013.01); *B29C 66/7292* (2013.01); *B29C 66/81423* (2013.01); *B29C 66/83241* (2013.01); *B29C 66/8614* (2013.01); *B29C 66/919* (2013.01); *B29C 66/91421* (2013.01); *B32B 2262/0284* (2013.01); *Y10T 428/1334* (2015.01)

(58) Field of Classification Search
CPC ... Y10T 428/1334; B29C 66/71; B29C 63/18; B29C 65/18; B29C 65/4815; B29C 66/1122; B29C 66/4322; B29C 66/496; B29C 66/53241; B29C 66/7292; B29C 66/81423; B29C 66/83241; B29C 66/8614; B29C 66/91421; B29C 66/919; B29K 2021/00; B32B 1/08; B32B 2262/0284; B32B 5/026; B32B 7/12; B32B 2270/00; B32B 2457/00; D06N 3/00
See application file for complete search history.

(56) References Cited

U.S. PATENT DOCUMENTS

| | | | |
|---|---|---|---|
| 4,500,371 | A | 2/1985 | De Groot |
| 4,791,966 | A | 12/1988 | Eilentropp |
| 4,803,103 | A | 2/1989 | Pithouse et al. |
| 4,940,820 | A | 7/1990 | Pithouse et al. |
| 5,099,889 | A | 3/1992 | Ratzlaff |
| 5,366,771 | A | 11/1994 | Beersel et al. |
| 5,796,045 | A * | 8/1998 | Lancien ............... B29C 57/02 156/86 |
| 6,805,281 | B1 | 10/2004 | Sirgedas |
| 8,273,429 | B2 | 9/2012 | Sellis et al. |
| 2007/0144764 | A1 | 6/2007 | Brambilla |
| 2007/0166495 | A1* | 7/2007 | Sellis ................. B32B 5/26 428/36.1 |
| 2010/0084179 | A1 | 4/2010 | Harris et al. |
| 2011/0083879 | A1 | 4/2011 | Avula et al. |
| 2011/0114214 | A1 | 5/2011 | Flachenecker |
| 2013/0228248 | A1 | 9/2013 | Malloy et al. |
| 2013/0273333 | A1 | 10/2013 | Meier et al. |

FOREIGN PATENT DOCUMENTS

| | | |
|---|---|---|
| EP | 0886357 A2 | 12/1998 |
| EP | 1798737 A1 | 6/2007 |
| EP | 2497805 * | 9/2012 |
| EP | 2497805 A1 | 9/2012 |
| FR | 2928199 A1 | 9/2009 |
| JP | H05212793 A | 8/1993 |
| JP | H08081851 A | 3/1996 |
| JP | H11270748 A | 10/1999 |
| JP | 2004332170 | 11/2004 |
| RU | 2480338 C2 | 4/2013 |
| SU | 727349 A1 | 4/1980 |
| SU | 994295 A1 | 2/1983 |
| SU | 1342433 A3 | 9/1987 |
| WO | 2011028460 A3 | 6/2011 |

* cited by examiner

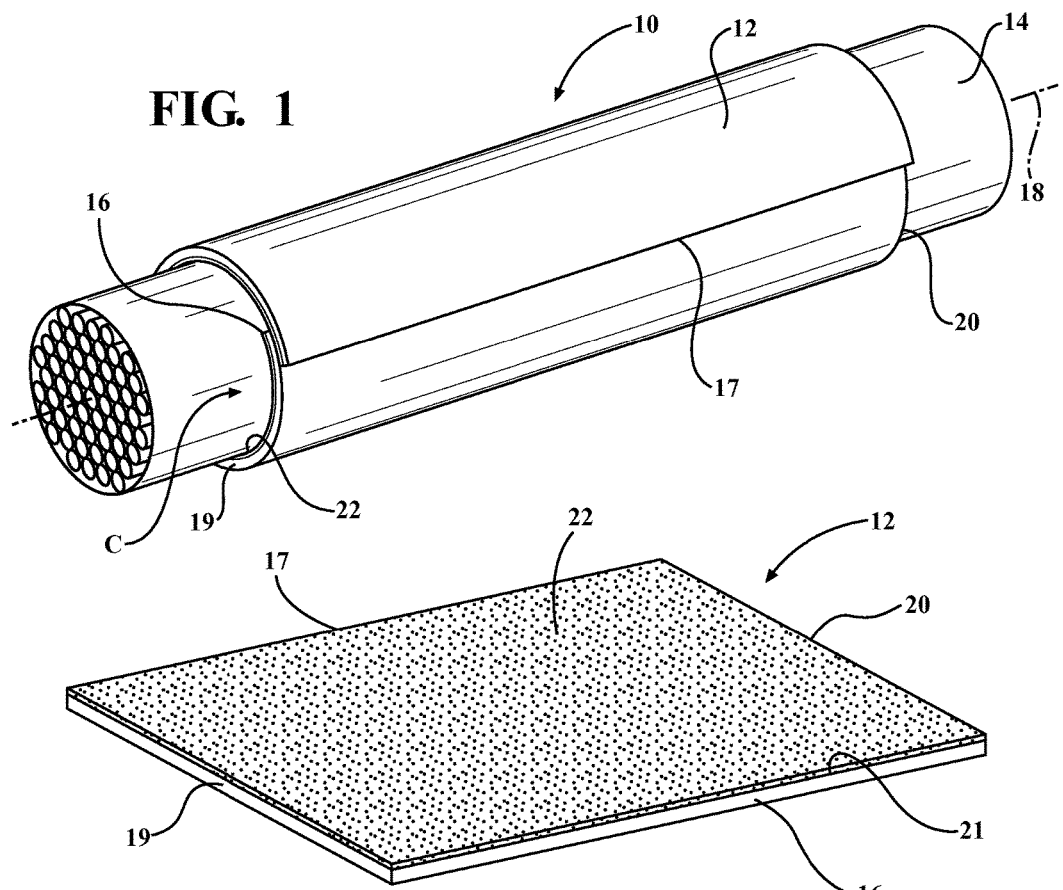
FIG. 1
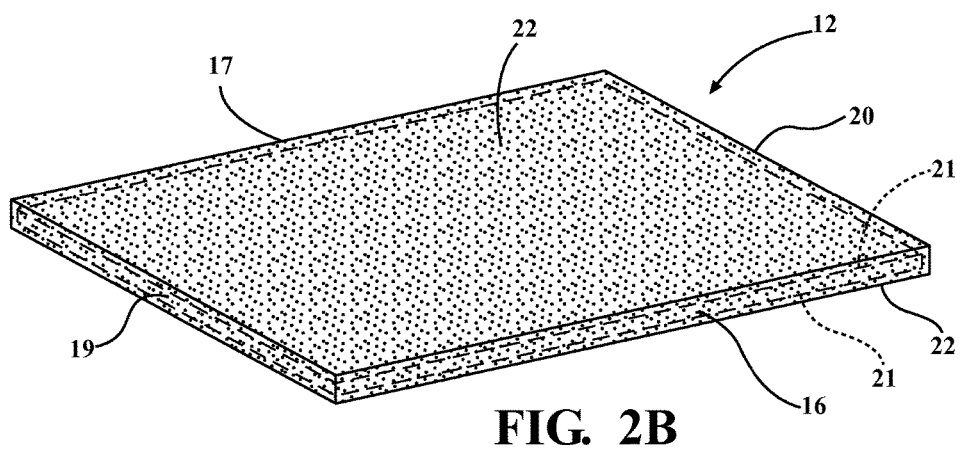
FIG. 2A
FIG. 2B

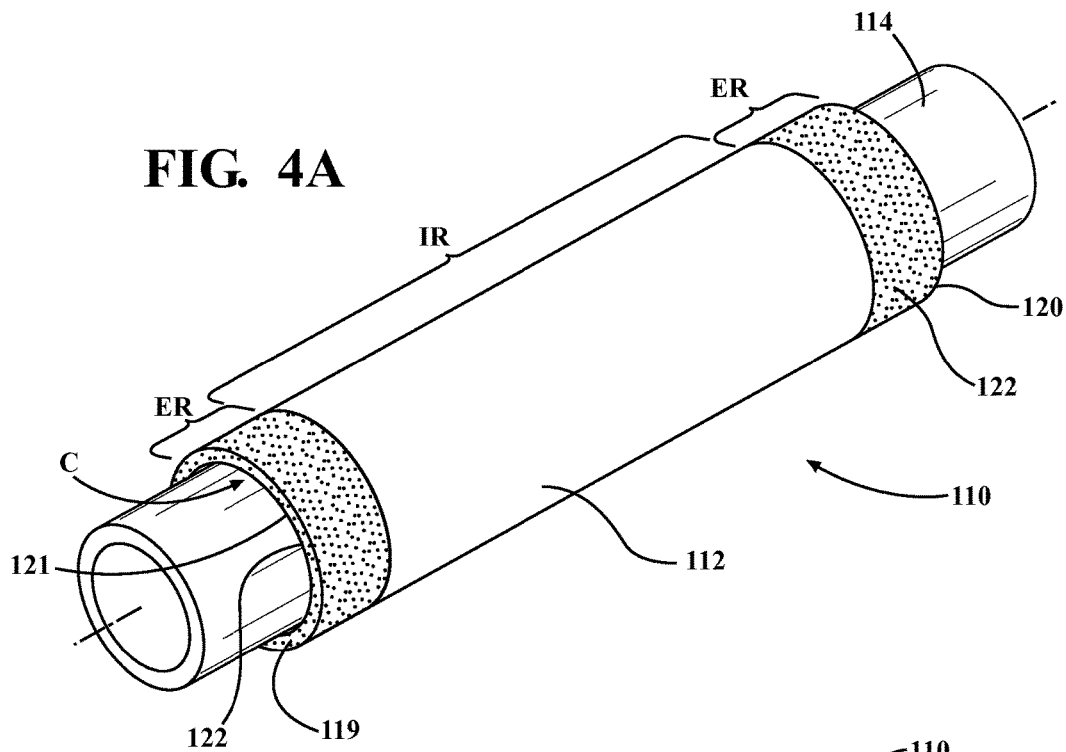
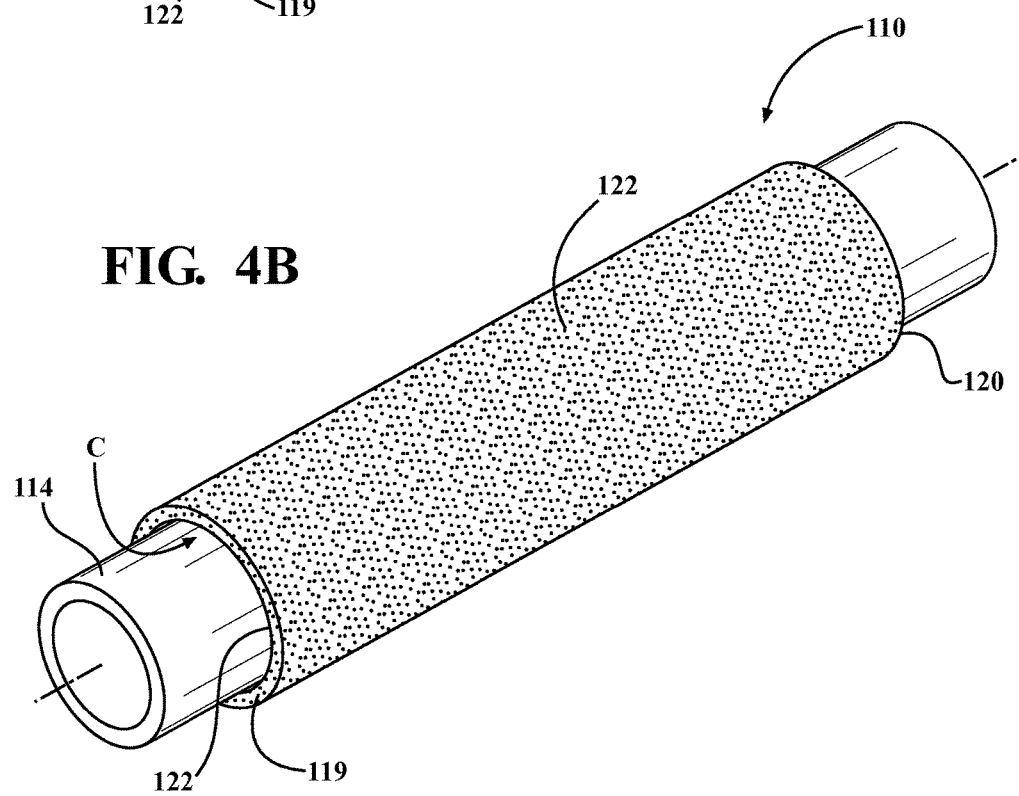

PROTECTIVE TEXTILE SLEEVE WITH HOT MELT FIXATION, END FRAY PREVENTION LAYER AND METHODS OF CONSTRUCTION AND APPLICATION THEREOF

CROSS-REFERENCE TO RELATED APPLICATION

This application claims the benefit of U.S. Provisional Application Ser. No. 61/869,842, filed Aug. 26, 2013, which is incorporated herein by reference in its entirety.

BACKGROUND OF THE INVENTION

1. Technical Field

This invention relates generally to protective textile sleeves for providing protection to elongate members contained therein, and more particularly to protective textile sleeves having a fixation mechanism for fixing the sleeves to an elongate member extending therethrough.

2. Related Art

Protective textile sleeves for providing protection to elongate members extending therethrough are known. Typically, the protective sleeves are formed having one of a tubular wall having a circumferentially continuous wall, or a wrappable wall having opposite lengthwise extending edges configured to be wrapped into overlapping relation with one another. Regardless of the type of aforementioned wall, the sleeves are typically fixed to the elongate member extending therethrough via wrapped tape or separately applied glue. The application of tape is costly from a material and labor standpoint, and can also prove to be unsightly if not applied neatly. Further, the externally applied tape can become damaged, thereby affecting its ability to reliably fix the sleeve to the elongate member. The application of separately applied glue is also costly from a material and labor standpoint, and can further add cost from the need to provide drying time for the glue. In addition, the glue can prove messy in application, thereby leading to further cost associated with the necessary clean-up thereof.

SUMMARY OF THE INVENTION

In accordance with one aspect of the invention, a protective textile sleeve provided. The sleeve has a wall of interlaced yarn having a cavity bounded by an inner surface extending between opposite open ends. A first material, facilitating bonding the wall to an outer surface of an elongate member extending therethrough, including a hot melt adhesive material is bonded to the wall immediately adjacent the opposite ends, and a second material, facilitating prevention of end fray of the wall ends, including an elastomeric material is bonded to the wall immediately adjacent the opposite ends.

In accordance with another aspect of the invention, the first material and the second material can be provided as a mixture bonded to the wall immediately adjacent the opposite ends.

In accordance with another aspect of the invention, an intermediate section of the wall extending between the opposite ends can remain free of the first and second materials.

In accordance with another aspect of the invention, the wall can be a wrappable wall having opposite edges adapted to be wrapped in overlapping relation with one another.

In accordance with another aspect of the invention, the wall can be a circumferentially continuous, seamless wall.

In accordance with another aspect of the invention, a method of constructing a textile protective sleeve is provided. The method includes interlacing yarn to form a wall having a cavity bounded by an innermost surface extending between opposite open ends. Further, bonding a first material including a hot melt adhesive material to the wall immediately adjacent the opposite ends, and further yet, bonding a second material including an elastomeric material to the wall immediately adjacent the opposite ends.

In accordance with another aspect of the invention, the method can further include applying the first and second materials as a mixture to the innermost surface.

In accordance with another aspect of the invention, the method can further include leaving an intermediate section of the wall extending between the opposite ends free of the first and second materials.

In accordance with another aspect of the invention, the method can further include forming the wall having opposite edges adapted to be wrapped in overlapping relation with one another.

In accordance with another aspect of the invention, the method can further include forming the wall having a circumferentially continuous, seamless wall.

In accordance with another aspect of the invention, the method can further include applying the mixture on an outer surface of the wall.

In accordance with another aspect of the invention, a method of fixing a textile sleeve, having a wall of interlaced yarn with a cavity bounded by an inner surface extending between opposite open ends with a hot melt adhesive material applied to the inner surface, about an elongate member is provided. The method includes extending the elongate member through the cavity; compressing the wall into abutment with the elongate member with a heated member and causing the hot melt adhesive material to bond with the elongate member.

In accordance with another aspect of the invention, the method can further include compressing the wall with the heated member adjacent the opposite open ends of the wall.

In accordance with another aspect of the invention, the method can further include leaving an intermediate section of the wall extending between the opposite ends in unbonded relation with the elongate member.

In accordance with another aspect of the invention, the method can further include applying an elastomeric material to the innermost surface in a mixture with the hot melt adhesive material.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

FIG. 1 is a perspective view of a textile sleeve constructed in accordance with one aspect of the invention fixed to an elongate member extending therethrough;

FIG. 2A is a perspective view of a wall of the textile sleeve constructed in accordance with one aspect of the invention;

FIG. 2B is a perspective view of a wall of the textile sleeve constructed in accordance with another aspect of the invention;

FIG. 4A is a perspective view of a textile sleeve constructed in accordance with another aspect of the invention fixed to an elongate member extending therethrough; and FIG. 4B is a perspective view of a textile sleeve constructed in accordance with yet another aspect of the invention fixed to an elongate member extending therethrough.

DETAILED DESCRIPTION OF PRESENTLY PREFERRED EMBODIMENTS

Figure 2C:
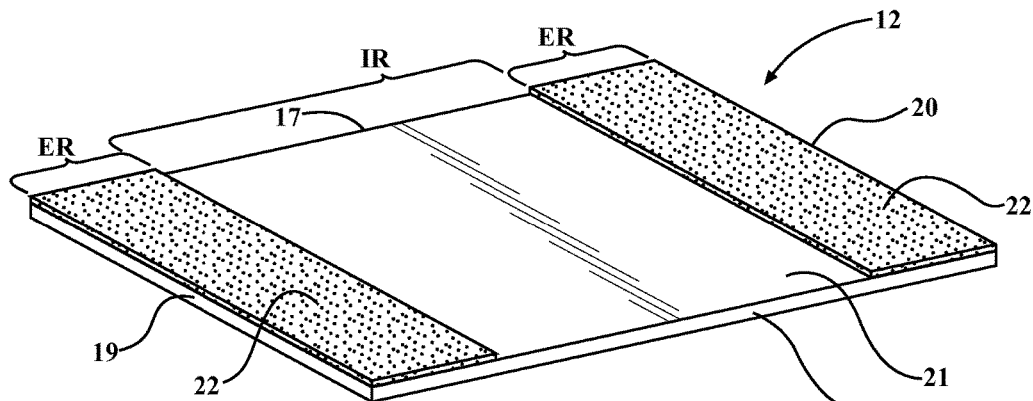
FIG. 2C is a perspective view of a wall of the textile sleeve constructed in accordance with yet another aspect of the invention.
Figure 2D:
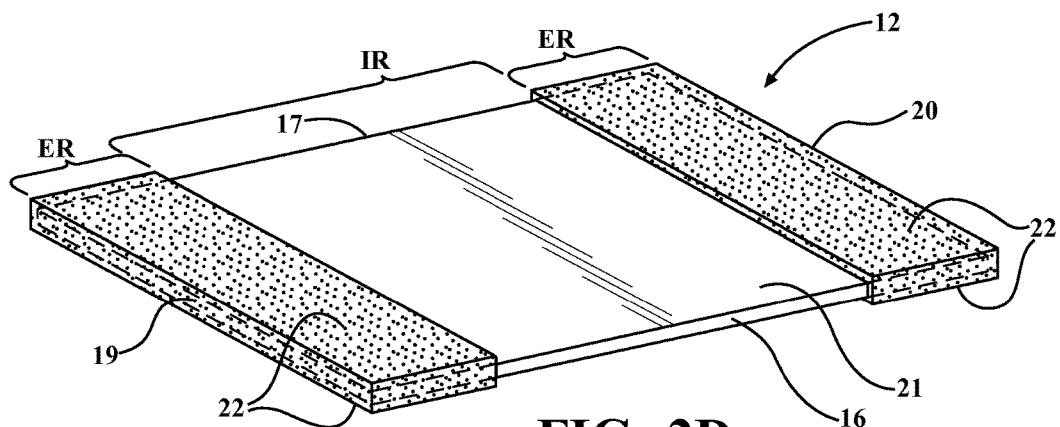
FIG. 2D is a perspective view of a wall of the textile sleeve constructed in accordance with yet another aspect of the invention.

Referring in more detail to the drawings, FIG. 1 illustrates a textile sleeve constructed in accordance with one aspect of the invention, shown as a wrappable sleeve, by way of example and without limitation, and referred to hereafter as sleeve 10. The sleeve 10 has a wrappable wall 12, such as a self-wrapping elongate wall that automatically curls into its wrapped configuration absent some externally applied force, for routing and protecting elongate members 14, such as a cable, wires or a wire harness, by way of example and without limitation. The elongate wall 12 has opposite edges 16, 17 extending generally parallel to a central, longitudinal axis 18 between opposite open ends 19, 20, wherein the edges 16, 17 are preferably biased into overlapping relation with one another in "cigarette wrapped" fashion to fully enclose the elongate member(s) 14 within a central cavity C of the sleeve 10. The cavity C is bounded by an innermost surface 21 of the wall 12 and is readily accessible along the full length of the longitudinal axis 18 so that the elongate member(s) 14 can be readily disposed radially into the cavity C, and conversely, removed from the cavity C, such as during service. To fix the wall 12 to the elongate member 14, thereby preventing relative rotational and axial movement therebetween, and further, to facilitate preventing end fray of the opposite ends 19, 20 the wall 12, such as during cutting in manufacture and also during in use, the wall 12 has a coating 22 formed from a mixture of a first material and a different second material bonded to the innermost surface 21 of the wall 12 immediately adjacent the opposite ends 19, 20. The first material includes a hot melt adhesive material to facilitate bonding the wall 12 to an outer surface of the elongate member 14 and the second material includes an elastomeric material to facilitate preventing end fray of the opposite ends 19, 20.

Depending on the application needs, the wall 12 can be constructed having any suitable size, including length and diameter. Further, the wall 12 can be formed of interlaced yarn using any desired interlacing process, such as braiding, weaving or knitting. If the wall 12 is formed as a self-wrapping wall, at least some of the weft-wise, circumferentially extending yarn, whether multifilament and/or monofilament, can be provided as any suitable heat-settable polymeric material, such as polyphenylene sulfide (PPS) or polyethyleneterephthalate (PET), for example.

To apply the mixture of the coating 22 to the wall 12, the mixture can be first formed as a pre-formed solid sheet of the coating 22 fabricated from the mixture, whereupon the solid sheet of the coating 22 can be laminated to the innermost surface 21 of the wall 12. Otherwise, the coating 22 of the mixture can be applied as a liquid to at least the innermost surface 21 (FIG. 2A), or about the entirety of the wall 12 (FIG. 2B), such as via a spraying or dipping process, by way of example and without limitation. Regardless of how the mixture of the coating 22 is bonded to the wall 12, at least the innermost surface 21 is coated, thereby providing the ability to bond the hot melt adhesive material of the mixture M to the outer surface of the elongate member 14. As such, it should be understood that the mixture can be applied, whether a pre-formed sheet or liquid, to cover the entirety of the innermost surface 21, and also, if desired, the entirety of the wall 12 including the outermost surface, thereby extending from one edge 16 to the other edge 17, and from one end 19 of the wall 12 to an opposite end 20 of the wall 12. Otherwise, as shown in FIG. 2C, the mixture can be applied, whether as a preformed solid sheet or liquid, to only the end regions ER of the wall 12 extending immediately adjacent the opposite ends 19, 20, thereby forming an intermediate region IR of the wall extending between the end regions ER, and thus, the opposite ends 19, 20, that is free or void of the coating 22, thereby saving expense on the cost of the coating, as well as maintaining maximum flexibility of the sleeve 10 within the intermediate region IR.

Figure 3:
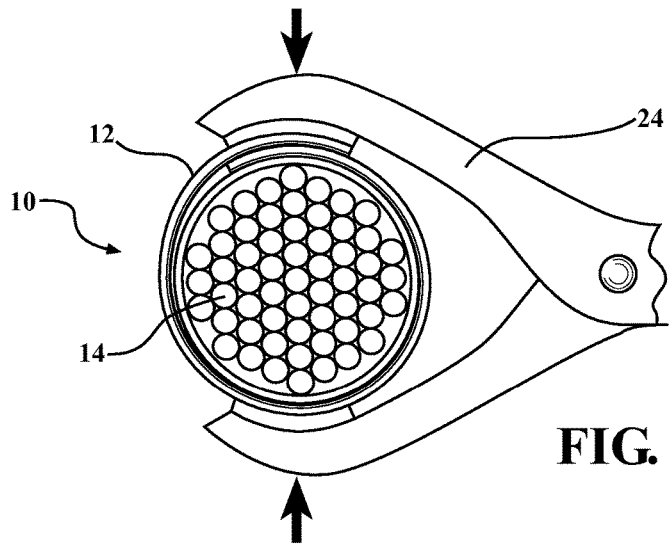
FIG. 3 illustrates a method of wrapping the wall of the sleeve and fixing the wall of the sleeve to an elongate member extending therethrough.

Upon bonding the coating 22 to the wall 12, the wall 12 can be heat-set into a self-wrapping wall and/or wrapped about the elongate member 14. Otherwise, it should be recognized that the wall 12 can first be heat-set into a self-wrapping wall and then the wall 12 can be sprayed, dipped or otherwise coated with mixture of coating material to arrive at one of the embodiments shown in FIGS. 2B (entire wall coated) and 2D (only end regions ER coated). Then, the elongate member 14 can be disposed within the cavity C of the sleeve 10, and as shown in FIG. 3, a compressive force F can then be applied to the wall 12 via a heated compressive member 24, such as a clamp or otherwise, wherein the compressive member 24 can be heated between about 200-250 degrees C., by way of example, to bring the innermost surface 21 and the hot melt adhesive material within the coating 22 into abutment with the outer surface of the elongate member 14, wherein the heated compressive member 24 causes the hot melt adhesive material to at least partially melt and bond to the outer surface of the elongate member 14. Accordingly, the wall 12 is fixed against relative movement with the elongate member 14 and is further fixed in its wrapped configuration. It should be recognized that the heated compressive member 24 can be compressed at a plurality of locations along the length of the sleeve 10, as desired, and preferably at least adjacent opposite ends 19, 20 of the sleeve 10 to ensure the ends 19, 20 are bonded with the elongate member 14.

In FIGS. 4A and 4B, a sleeve 110 constructed in accordance with another aspect of the invention is shown, wherein the same reference numerals, offset by a factor of 100, are used to identify like features. Rather than the sleeve 110 having a wrappable wall, a wall 112 of the sleeve 110 is constructed as a circumferentially continuous, seamless wall 112 using one of the aforementioned processes discussed above, such as, braiding, weaving or knitting. With the wall 112 being circumferentially continuous, a mixture of the material forming a coating 122 is not applied as a pre-formed laminated sheet to an innermost surface, but rather, the mixture of the first and second materials is applied as a liquid to an innermost surface 121, such as by dipping or spraying the wall 112 in or with the mixture including hot melt adhesive material, such as a hot melt powder material added to an elastomeric material, by way of example and without limitation. Of course, other application methods for applying the liquid mixture to the innermost surface 121 can be used, such as spreading and coating the mixture material as a paste-like substance via any suitable spreading mechanism. In addition to the hot melt adhesive powder bonding the wall 112 to the elongate member 114, the elastomer material within the mixture, upon solidifying the coating 122 on the wall 112, at least about the end regions of the wall 112, functions to prevent end fray of the yarn material of the wall 112. As shown in FIG. 4A, application of the mixture to the wall 112 can include dipping opposite ends 119, 120 of the wall 112 in a melted solution of the mixture and then allowing the dipped ends 119, 120 to dry and solidify, thereby forming the coating 122 on the end regions ER of the sleeve 110, with an intermediate region IR remaining free of the coating. Of course, if the ends 119, 120 are dipped, then an outer surface of the wall 112 is also coated, which further contributes to the prevention of end fray. Of course, if desired, as shown in FIG. 4B, the entire wall 112 could be dipped in the mixture thereby applying the coating 122 over the entire innermost and outer surfaces of the wall 112.

As with the previous embodiment, upon applying and bonding the mixture to the wall 112 to form the desired coating 122, the elongate member 114 is disposed within a cavity C of the wall 112, and then, a compressive force F is applied to the wall 112 via a heated compressive member 24, such as between about 150-250 degrees C. to at least partially melt and bond the adhesive material within the mixture to the outer surface of the elongate member 114. Accordingly, the wall 112 is fixed against relative movement with the elongate member 114, and the ends 119 are 120 are protected against end fray via the elastomeric material within the coating 122.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A protective textile sleeve for providing protection to an elongate member contained therein, comprising:
    a wall of interlaced yarn having a cavity bounded by an innermost surface extending between opposite open ends;
    a coating mixture including a first material and a second material bonded to said wall immediately adjacent said opposite ends, said first material including a hot melt adhesive material, said hot melt adhesive material having melt temperature between about 150-250 degrees Celsius;
    said second material including an elastomeric material;
    wherein said wall is a wrappable wall having opposite edges adapted to be wrapped in overlapping relation with one another, wherein said opposite edges extend generally parallel to a central, longitudinal axis of said cavity, wherein said wall is heat-set to bias said opposite edges into overlapping relation with one another, wherein said wall has an intermediate section extending from one of said opposite edges to the other of said opposite edges, said intermediate section extending between said first and second materials adjacent said opposite ends, said intermediate section being free of said first and said second materials.

2. The protective textile sleeve of claim 1 wherein said wall is braided.

3. The protective textile sleeve of claim 1 wherein said first material is bonded to said innermost surface of said wall.

* * * * *